(12) United States Patent
Koussa et al.

(10) Patent No.: US 11,556,550 B2
(45) Date of Patent: Jan. 17, 2023

(54) METHODS AND SYSTEMS FOR NO FAIL SEARCHING

(71) Applicant: RELX Inc., Miamisburg, OH (US)

(72) Inventors: Mark Koussa, Hawthorne, CA (US); Michael Oberle, Holly Springs, NC (US)

(73) Assignee: RELX INC., Miamisburg, OH (US)

( * ) Notice: Subject to any disclaimer, the term of this patent is extended or adjusted under 35 U.S.C. 154(b) by 0 days.

(21) Appl. No.: 17/231,285

(22) Filed: Apr. 15, 2021

(65) Prior Publication Data

US 2022/0335050 A1 Oct. 20, 2022

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC .......... G06F 16/24578; G06F 16/248
See application file for complete search history.

(56) References Cited

U.S. PATENT DOCUMENTS

| | | | | |
|---|---|---|---|---|
| 6,006,225 A * | 12/1999 | Bowman | ............... | G06F 16/951 707/999.005 |
| 6,594,670 B1 * | 7/2003 | Genser | ................. | G06F 16/338 707/999.102 |
| 7,496,559 B2 | 2/2009 | Gross et al. | | |
| 7,899,818 B2 * | 3/2011 | Stonehocker | ....... | G06F 16/3325 715/780 |
| 8,250,609 B1 * | 8/2012 | Henty | ................ | H04N 21/4828 707/708 |
| 8,849,785 B1 * | 9/2014 | Shattuck | ............... | G06F 16/951 707/706 |
| 9,594,838 B2 | 3/2017 | Wang et al. | | |
| 2006/0129534 A1 * | 6/2006 | Jones | ................... | G06F 16/9535 |
| 2006/0236216 A1 * | 10/2006 | Blackwell | ............. | G06F 16/951 707/E17.108 |
| 2008/0021884 A1 * | 1/2008 | Jones | .................... | G06F 16/951 |
| 2008/0282291 A1 * | 11/2008 | Henty | ................ | H04N 21/4622 707/E17.014 |
| 2012/0023104 A1 | 1/2012 | Johnson et al. | | |
| 2012/0132378 A1 | 5/2012 | Caruso | | |

(Continued)

FOREIGN PATENT DOCUMENTS

KR 20150001872 A 1/2015

*Primary Examiner* — Jorge A Casanova
(74) *Attorney, Agent, or Firm* — Dinsmore & Shohl LLP

(57) ABSTRACT

The method of no fail searching may include receiving a set of keywords from an input set of search fields within a GUI, retrieving a set of search results based on the set of keywords from the input set of search fields, organizing the set of search results according to a set of content types, ranking each search field according to the set of content types, removing the lowest ranked search field from the set of keywords to create a broadened set of search fields when at least one content type has zero results, repeating the retrieving, organizing, ranking, and removing steps until either each content type contains a threshold amount of search results or all search fields have been removed, wherein the broadened set of search fields is used as the input set of search fields in subsequent retrieving steps.

20 Claims, 4 Drawing Sheets

(56) References Cited

U.S. PATENT DOCUMENTS

| | | | |
|---|---|---|---|
| 2012/0166450 A1* | 6/2012 | Choi | G06F 16/24534 |
| | | | 707/E17.084 |
| 2012/0179705 A1* | 7/2012 | Kumaran | G06F 16/3325 |
| | | | 707/E17.062 |
| 2012/0296926 A1* | 11/2012 | Kalin | G06F 16/3322 |
| | | | 707/765 |
| 2012/0310929 A1 | 12/2012 | Patterson et al. | |
| 2012/0323879 A1 | 12/2012 | Herbert, Jr. et al. | |
| 2013/0024440 A1* | 1/2013 | Dimassimo | G06F 16/951 |
| | | | 707/706 |
| 2014/0207751 A1 | 7/2014 | Musgrove | |
| 2014/0365481 A1* | 12/2014 | Novosel | G06F 16/951 |
| | | | 707/728 |
| 2015/0205866 A1* | 7/2015 | Shaw | G06F 16/951 |
| | | | 707/E17.084 |
| 2017/0220680 A1* | 8/2017 | Shattuck | G06F 16/3326 |
| 2018/0101532 A1 | 4/2018 | Gage et al. | |
| 2021/0173850 A1* | 6/2021 | Ross | G06F 16/26 |

* cited by examiner

METHODS AND SYSTEMS FOR NO FAIL SEARCHING

TECHNICAL FIELD

The present disclosure relates to methods and systems for no fail searching. In particular, methods and systems for searching that return results from the most productive set of search terms.

BACKGROUND

When performing a search for electronic documents using a search engine, the user has to determine the set of keywords to provide the search engine to define the basis as to what documents the search engine retrieves. If the user provides too narrow of a set of keywords, then the search engine may return few or no results. If the user provides too broad of a set of keywords, then the search engine may return too many or irrelevant results. The user, therefore, must strike a balance in keywords selection such that the search engine may return a numerous yet relevant set of results.

Current systems typically require the user to manually modify the keywords and perform the search again if a search does not yield the quantity or quality of results the user hoped to achieve. For instance, when users search for documents, they generally have an idea of the type of documents they want to find, and thus may err on the side of a narrower set of keywords to perform the search. If the user's keywords turn out to be too narrow, the search has failed. The user must remove some of the keywords to broaden the search and then re-run the search. This process may be repeated until the user receives a satisfactory set of results. This issue is worsened when the user must perform the search across multiple levels of content types. For instance, if the user is a legal researcher, what was already a narrow set of keywords becomes even narrower when the researcher wants to search for these keywords in a plurality of content types such as regulations, case law, verdicts, and settlements.

Therefore, improved methods for searching for electronic documents are desired.

SUMMARY

Embodiments of the present disclosure are directed to methods and systems for no fail searching. In particular, methods and systems for searching that return results from the most productive set of search terms.

In one embodiment, a method for searching electronic documents includes receiving a set of keywords from an input set of search fields within a graphical user interface (GUI); retrieving a set of search results based on the set of keywords from the input set of search fields; organizing the set of search results according to a set of content types; ranking each search field according to the set of content types; removing the lowest ranked search field from the set of keywords to create a broadened set of search fields when at least one content type has zero results; and repeating the retrieving, organizing, ranking, and removing steps until either each content type contains a threshold amount of search results or all search fields have been removed, wherein the broadened set of search fields is used as the input set of search fields in subsequent retrieving steps.

In another embodiment, a system for searching electronic documents includes one or more processors and a non-transitory computer-readable medium storing computer-readable instructions. The computer-readable instructions, when executed by the one or more processors, cause the one or more processors to receive a set of keywords from an input set of search fields within a GUI; retrieve a set of search results based on the set of keywords from the input set of search fields; organize the set of search results according to a set of content types; rank each search field according to the set of content types; remove the lowest ranked search field from the set of keywords to create a broadened set of search fields when at least one content type has zero results; and repeat the retrieving, organizing, ranking, and removing steps until either each content type contains a threshold amount of search results or all search fields have been removed, wherein the broadened set of search fields is used as the input set of search fields in subsequent retrieving steps.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE DRAWINGS

The embodiments set forth in the drawings are illustrative and exemplary in nature and not intended to limit the subject matter defined by the claims. The following detailed description of specific embodiments of the present disclosure can be best understood when read in conjunction with the following drawings, where like structure is indicated with like reference numerals and in which:

DETAILED DESCRIPTION

When performing a search for electronic documents using a search engine, the user has to determine the set of keywords to provide the search engine to define the basis as to what documents the search engine retrieves. If the user provides too narrow of a set of keywords, then the search engine may return few or no results. If the user provides too broad of a set of keywords, then the search engine may return too many or irrelevant results. The user, therefore, must strike a balance in keywords selection such that the search engine may return a numerous yet relevant set of results.

Embodiments of the present disclosure are directed to methods and systems for searching that return results from the most productive set of search terms. The methods and systems described herein search a set of electronic documents for electronic documents that contain a set of keywords for assigned search fields as input by the user. The search outputs a set of results grouped according to content type (e.g., in the field of law, content types may be regulations, case law, verdicts, and settlements) of each electronic document. If no results are found any content type, however, the search is automatically broadened by removing the lowest ranked search field and re-performing the search for that content type. Search fields are removed until no search fields remain or until the search returns results for that content type.

This resolves the need for the user to manually modify the keywords and perform the search again if a search does not yield the quantity or quality of results the user had hoped to achieve. Through this system, if a user's keywords turn out to be too narrow, the user does not need to manually remove keywords to broaden the search and then manually re-run the search. The user also does not have to repeat the process until the user receives a satisfactory set of results. Furthermore, the user does not have to repeat this process through multiple levels of content types, such as regulations, case law, verdicts, and settlements.

Embodiments of the present disclosure also provide a graphical user interface (GUI) for searching electronic documents and presenting the search results. A search GUI may be used to help segment keywords into categories that may help the search engine retrieve more relevant search results. The results GUI may be used to present results in a way that is more meaningful to the user, such as by the type of content contained in the document, the number of results found, the keywords used, etc.

Various embodiments for methods and systems of no fail searching are described in more detail below.

Figure 1:
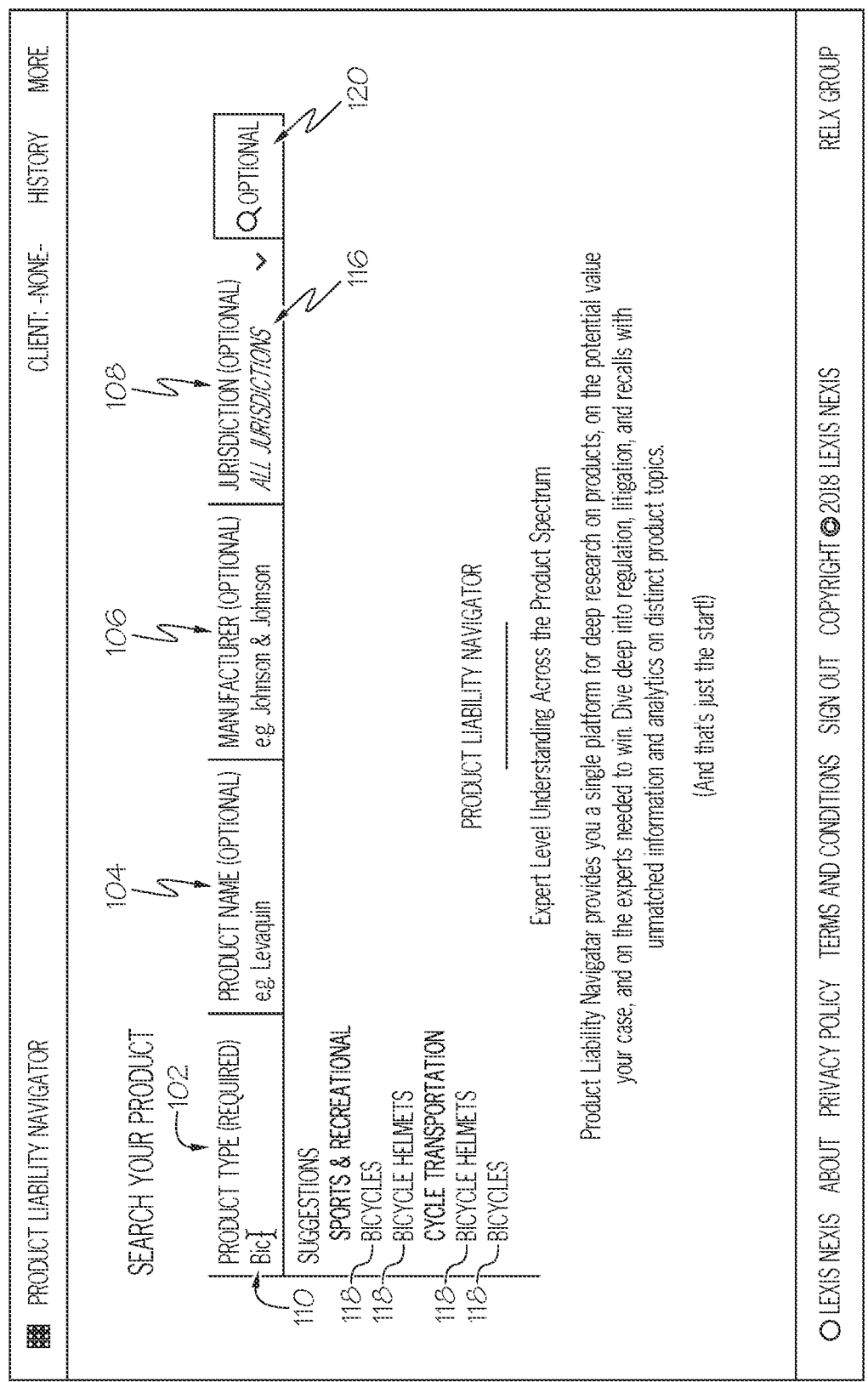
FIG. 1 is an illustration of an example graphical user interface of a search interface, according to one or more embodiments shown and described herein.

Referring now to FIG. 1, a non-limiting example of a search graphical user interface (GUI) 100 according to one or more embodiments is shown. The search GUI 100 may be presented on a web browser, for example. The search GUI 100 may also be presented as a browser extension, a standalone application, among other things.

The search GUI 100 allows a user to interact with a search engine. The search GUI 100 contains search fields 102-108 for the search engine to receive keywords 110-116 from the user. The keywords may relate to particular search fields. For example, the "All Jurisdictions" keyword 116 relates to the "Jurisdiction" search field 108.

Each electronic document may have a body of text and a set of metadata, among other things. The search engine may identify keywords in the body of text of each document. If the document contains each of the keywords, then the document may be included in the search results. For example, a published product liability court case is likely to have the name of the product and the jurisdiction of the court in its body of text because they are necessary for the court's discussion of liability and venue.

However, the search fields 102-108 may be used to direct the search of a particular keyword 110-116 to a specific portion of a document, such as its metadata. A document's metadata may include categories matching the subject of each of the search fields. For instance, a published product liability court case document may have metadata that lists the case's relevant jurisdiction and the product being discussed, and the product being discussed may have a corresponding category, name, and manufacturer. These attributes may be assigned to an electronic document in the form of metadata as the document is being uploaded to the document database for future searching and retrieval. The search fields may be used to direct its corresponding keywords to the specific metadata attributed to each electronic document.

For example, as an electronic document is being uploaded to a product liability document database, the document may be scanned to identify features, including, e.g., date published, jurisdiction, product type, product name, manufacturer, among other things, that are assigned to the document as metadata. This increases the efficiency of the search process because the search engine no longer has to scan the body of each document in its entirety for a number of keywords in real time. The search engine can receive keywords relating to the particular category of metadata and search an index of the particular category of metadata for the received keywords, where the index may then point to the actual electronic document.

Referring still to FIG. 1, the search GUI 100 may present suggested keywords 118 as the user types a keyword. For example, as a user types a keyword 110, one or more suggested keywords 118 may be displayed to the user for the user to select. In the illustrated example, as the user types the letters "Bic" in the first search field 102, suggested keywords 118 such as "Bicycles" and "Bicycle Helmets" are displayed for user selection. Search GUI 100 may also present example keywords in the search fields 102-108. For example, search field 104 may contain "e.g., Levaquin" to indicate to the user an example of what may be entered into search field 104. When the user clicks search field 104, the indication may be removed to make way for the user's input.

Keywords may also be limited to only a selection among a predetermined set of inputs in a particular search field 102-108. For example, keywords 112 are limited to those words that are provided in a dropdown list. In the illustrated embodiment, the fourth search field 108 is directed to jurisdiction, and thus the keywords 112 may be limited to valid jurisdictions, such as the different state and federal jurisdictions, that are selectable by the user.

In some instances, users may not even need to input a keyword into a search field as some search fields may be optional 104-108. In other instances, users may be required to input a keyword into a search field as some search fields may be required 102. The search fields 102-108 may be represented as text boxes as shown, for example. The search fields 102-108 may also be represented as checkboxes, dropdowns, radio buttons, and the like.

After keywords 110-112 have been input and/or selected, the search may be executed by the user by pressing a search button 120, for example. In some embodiments, the search button 120 may be represented as a clickable icon, for example. In other embodiments, the system may automatically begin searching as the user inputs keywords 110, and thus may not need a search button 120. After the search begins, the search GUI 100 may display a progress bar to show how soon the search will complete.

To illustrate typical search case without the methods described herein, take an example set of search keywords for a specific product to find documents relating to products liability: a "dw568 black and decker drill." In a standard searching scenario, wherein a user inputs those keywords into the search bar of a legal database and presses search, the search engine returns 0 electronic documents across any content types. The user may try to adjust the search terms by removing the keyword "drill," but there may still be no results. The user may try instead to remove "dw568" but now may have, at best, a scattered set of results where many results may lack relevance because, for instance, there may fact patterns discussed in criminal court cases where a "black and decker drill" was negligently used.

By contrast, the same user may use the same keywords "dw568 black and decker drill" in an example use case of an embodiment described herein. Unlike the generic search engine of the previous use case, the search GUI 100 relates to a product liability search took other embodiments may relate to other specific fields such as, without limitation, patents and scholarly literature. For search GUI 100, the search fields 102-108 are "Product Type" 102, "Product Name" 104, "Manufacturer" 106, and "Jurisdiction" 108. In the illustrated example, the "Product Type" search field 102 is required, but the other search fields 104-108 are optional. However, it should be understood that embodiments are not limited thereto. The "Product Type" 102, "Product Name" 104, and "Manufacturer" 106 are input boxes that receive text from the user, whereas the "Jurisdiction" search field 108 is a dropdown menu that defaults to the "All Jurisdictions" keyword 112 but also contains options for other jurisdictions, such as individual states, for the user to select.

As the user enters a keyword 110, "dri" in this example, the GUI 100 may present other suggested keywords 118, and the user selects "Drill." The user also enters the keyword "dw568" for the "Product Name" search field 104, "black & decker" for the "Manufacturer" search field 106, and "Rhode Island" for the "Jurisdiction" search field 108. The user executes the no fail search by clicking the "Search" button 120. The search is run across a number of relevant content types 202-218 including, e.g., regulations 208, recalls & reports 210, and verdicts & settlements 214. In other fields, the content types may be tailored to other relevant forms of electronic documents based on the specific subject matter to which the search engine relates. The system may display a message saying that the search is being optimized, because we know that a standard search would yield no results. By optimizing the search, the search engine is applying an embodiment method of the present disclosure that automatically removes one or more keywords for each content type that returned no results and re-runs the search with the broadened set of keywords, as will be described in more detail below.

Figure 2:
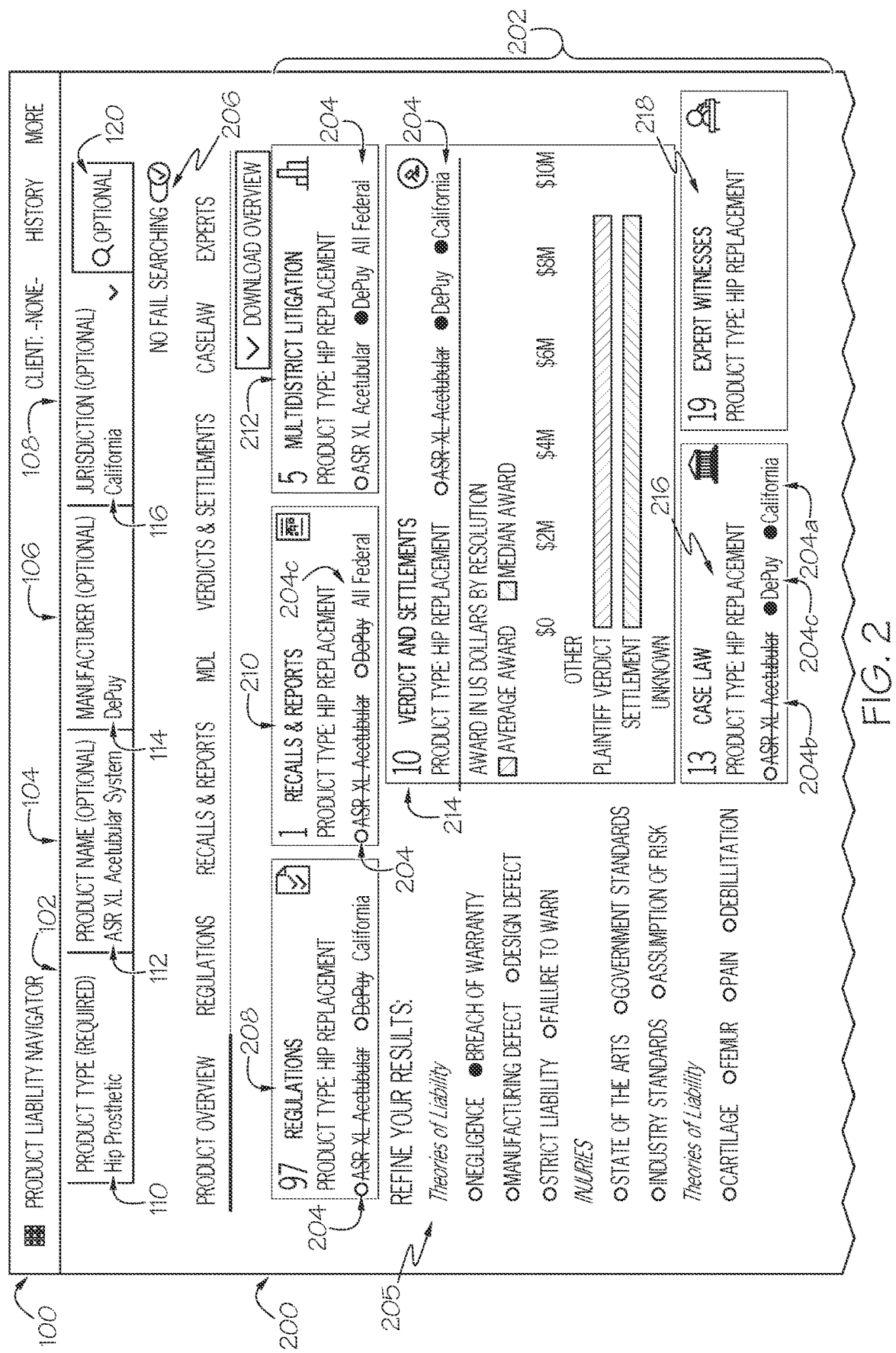
FIG. 2 is an illustration of an example graphical user interface of a results interface, according to one or more embodiments shown and described herein.

Referring now to FIG. 2, an example results GUI 200 interface according to one or more embodiments shown. The results GUI 200 may be presented on a web browser, for example. The results GUI 200 may also be presented as a browser extension, a standalone application, among other things.

The results GUI 200 presents to the user the results returned by the search. As an example, FIG. 2 presents the results grouped by their content type 208-218. Content types are categories of documents that may be relevant to the subject matter of the search engine. For instance, the content types relevant to a product liability search engine may be regulations 208, recalls 210, verdicts 214, case law 216, etc., whereas the content types relevant to a scholarly literature search engine may be as citing references, peer reviews, patents, etc.

The results, as shown in results GUI 200, may be presented to the user as a grid of content types 202 indicating the number of results found for each content type 208-218. Results may also be presented as a table, rather than a grid, or in other configurations. The grid and/or table of content types 208-218 may be clickable to direct the user to a list of results for that content type 208-218. Results may also be presented as a direct hyperlink to the particular result, rather than the number of results for a content type 208-218. The grid and/or table may also present excerpts and/or synopses of the results. The grid and/or table may also present a summary of the results for each content type 208-218 in the form of charts, graphs, and the like.

Each content type 208-218 may contain keyword search filters 204, one for each keyword 110-116 that was utilized in the search. Keywords 110-116 that were utilized in a particular search may be presented as keyword search filters with an indicator, e.g., 204a. Keywords 110-116 that were not utilized in the same search may be presented as keyword search filters without an indicator, e.g., 204b. Keyword search filters 204 may be clickable to manually refine the search to include or exclude, as the case may be, a particular keyword corresponding to the keyword search filter 204. Upon toggling a keyword search filter 204, the search may be automatically run with the new keywords. In other embodiments, the user may have to direct the system to perform the search after toggling a set of keyword search filters 204. The search may be forced to run without removing the particular toggled keyword represented by the keyword search filter 204, as it typically may using an embodiment of the no fail search method 300 as described herein.

Embodiments of the results GUI 200 may also contain result filters 205. Result filters 205 may be static or automatically generated. Result filters 205 that are static may include filters that filter results by date, time, length, relevance, and the like. Result filters 205 that are automatically generated may be based on the keywords 110-116, types of documents, subjects related to the subject matter of the search engine, and the like. For instance, in a product liability search engine, automatically generated search filters may include theories of liability, affirmative defenses, and injuries, because they relate to product liability. These may be areas of discussion within documents but do not define the type of document itself as content types 208-218 do. Users may toggle a result filter 205 to further refine the search results without having to perform another search.

Embodiments may also include a "No Fail Searching" search method toggle 206. Activating the search method toggle 206 will run searches according to the methods as disclosed herein. Deactivating the search method toggle 206 will run searches as they are typically performed. That is, the search results will comprise electronic documents that contain all of the provided keywords, like in the standard searching scenario as described above.

Embodiments may also include the search GUI 100 for reference and for subsequent modifications of the search. The search GUI 100 may be presented anywhere relative to the results GUI 200, if at all, and may be a condensed or otherwise modified form of search GUI 100. The results GUI 200 may also simply include a button for the user to click to return to the search GUI 100.

In an example implementation of an embodiment, results GUI 200 relates to a product liability search tool. The search fields are "Product Type" 102, "Product Name" 104, "Manufacturer" 106, and "Jurisdiction" 108. The "Product Type" search field 102 is required, but the other search fields are optional. The "Product Type" 102, "Product Name" 104, and "Manufacturer" 106 are input boxes that receive text from the user, whereas the "Jurisdiction" search field 108 is a dropdown menu that defaults to the "All Jurisdictions" keyword 116 but also contains options for other jurisdictions, such as individual states.

In the illustrated example, the "Product Type" search field 102 contains the keyword "Hip Prosthetic" 110, the "Product Name" search field 104 contains the keyword "ASR XL Acetabular System" 112, the "Manufacturer" search field 106 contains the keyword "DePuy" 114, and the "Jurisdiction" search field 108 has the keyword "California" 116 selected.

The no fail search method 300 was used for this particular search as the method toggle 206 is active. Other indicators that the no fail search method 300 was used is the strikethrough of certain key words. For instance, in the "Case Law" content type 216, key word "ASR XL Acetabular System" 112 is struckthrough in its corresponding keyword search filter 204b. This indicates that the "Product Name" search field 104 was automatically removed in the search for the "Case Law" content type 216 to broaden the keywords 110-116 for the subsequent search iteration at step 312. The user could toggle the keyword search filter "ASR XL Acetabular System" 112 by clicking on it, and direct the system to perform the search again with keyword "ASR XL Acetabular System" 112 for the "Case Law" content type 216.

It is to be noted that although a keyword may not be used for one content type, it may be used for others. For instance, the "DePuy" search filter 204c is not struckthrough in the case law content type 216, indicating that the search field 106 was not removed for this content type. On the other hand, the "DePuy" search filter 204c in the "Recalls & Reports" content type 210 is struckthrough, indicating that the search field 106 was removed for this content type.

In addition, results GUI 200 also includes result filters 205 that may be toggled to refine the search results without performing another search. For instance, in FIG. 2, the "Breach of Warranty" filter is toggled. This results in only the results related to breach of warranty being presented to the user. The results GUI 200 may also be updated to present the number of results for each content type 208-218 after toggling the search filter.

Figure 3:
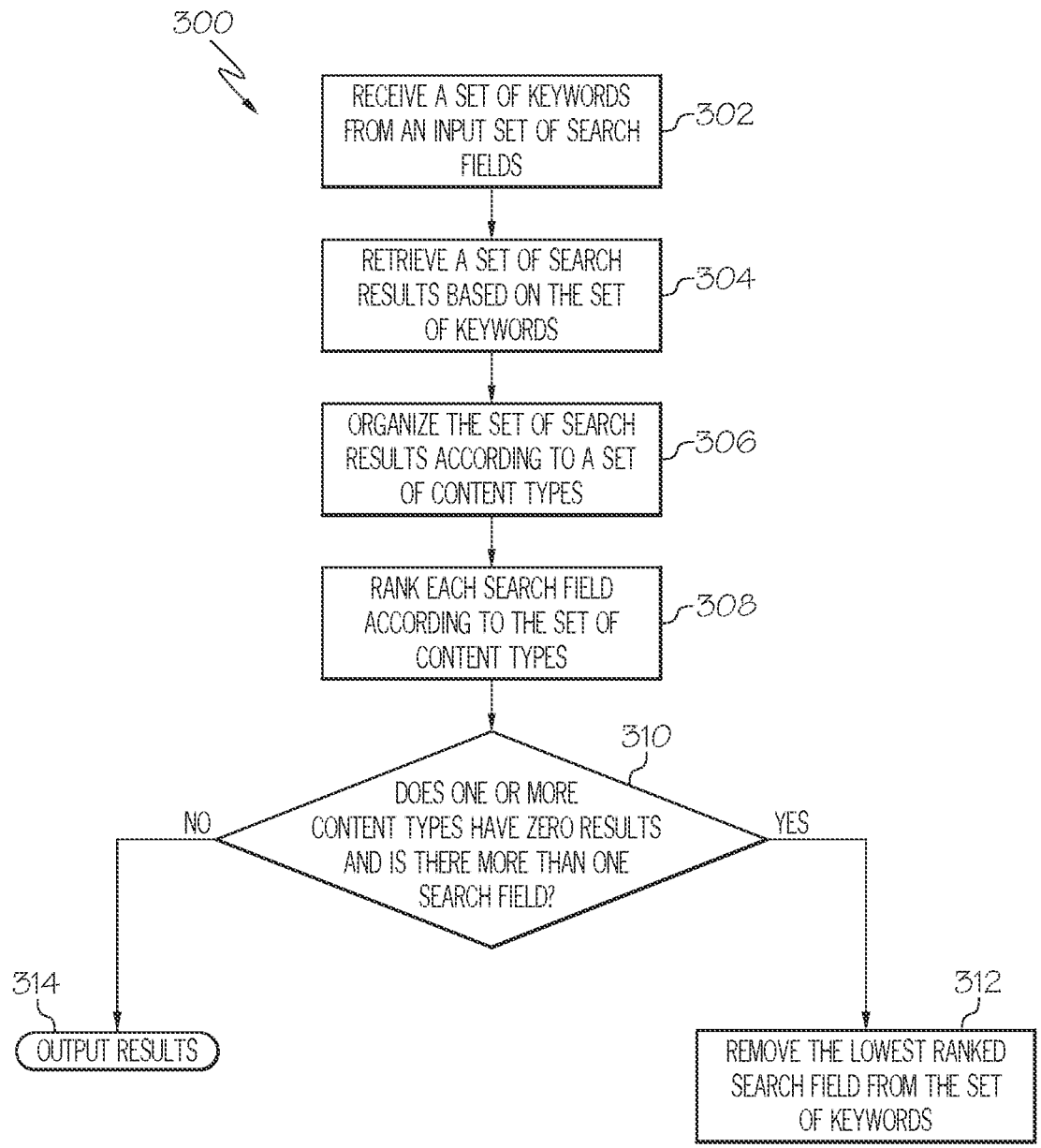
FIG. 3 is a flowchart of an example method for no fail searching, according to one or more embodiments shown and described herein.

Referring now to FIG. 3, a flowchart of an example no fail searching method 300 shown. It should be understood that embodiments are not limited by the order of the steps in method 300 nor are embodiments limited to the steps included in method 300. Searches based on the following method 300 are not limited to specific keywords, search fields, content types, or subject matters.

The method 300 begins by performing an initial information retrieval step 302 to retrieve a set of one or more keywords as input by a user. The keywords may be like the keywords 110-116 in FIGS. 1 and 2, described above. The set of keywords may be grouped according to search fields like the search fields 102-108 in FIGS. 1 and 2, described above.

The keywords may be received from a search GUI 100. The search GUI 100 may be generated from a software application on a server device 400 for a particular user session on a user computer 416. The user computer 416 may present the search GUI 100 to the user on a web browser, a plug-in client application for a web browser, a standalone application, etc. The user computer 416 may be a desktop computer, laptop computer, smartphone, tablet, etc.

Although it is a goal of some embodiments of method 300 to automatically remove search fields to broaden the search, the user may indicate via the search GUI 100 that some terms are locked (i.e., not to be automatically removed).

At step 304, the set of keywords are used as inputs to a search engine to retrieve a set of search results. Search engines are not limited to a particular methodology of database searching or database tool for searching. The search engine may identify keywords in the body of text of each document. If the document contains each of the keywords, then the document may be included in the search results. For example, a published product liability court case is likely to have the name of the product and the jurisdiction of the court in its body of text because they are necessary for the court's discussion of liability and venue.

The search engine may also use the search fields to direct keywords to the specific metadata attributed to each electronic document. For example, as an electronic document is being uploaded to a product liability document database, the document may be processed to identify features, including, e.g., date published, jurisdiction, product type, product name, manufacturer, among other things, that are assigned to the document as metadata.

At step 306, the search results are organized according to a set of content types. The set of content types may be predefined or defined at the time of searching. Content types are categories of documents that may be relevant to the subject matter of the search engine. For instance, the content types relevant to a product liability search engine may be regulations, recalls, verdicts, case law, etc., whereas the content type relevant to a scholarly literature search engine may be as citing references, peer reviews, patents, etc.

At step 308, the search fields are ranked according to each content type. The more productive a search field is relative to other search fields in regards to a particular content type, the higher the search field is ranked for that content type. In some embodiments, a search field is considered productive if the search returns results for a content type that can be attributed to the search field. The corollary then is a search field that is less productive will be ranked lower than other search fields for a particular content type.

For example, in a product liability no fail search embodiment described above, the "Product Name" search field 104 contains the keyword "ASR XL Acetabular System" 112 and the "Product Type" search field 102 contains the keyword "Flip Prosthetic" 110. When the system is searching for documents in the "Regulations" content type 208, key word 112 in search field 104 may yield no results because there may be no regulations specifically related to ASR XL acetabular systems. On the other hand, keyword 114 in search field 106 may yield numerous regulations specifically related to hip prosthetics. Because search field 106 yielded more results for content type 208 than search field 102, search field 106 was more productive and will be ranked higher than 102.

At step 310, each content type is checked for results. If at least one content type has no results and there is more than one search field, then the method moves to step 312. Otherwise, the method ends at step 314, where the search results are output to the user.

At step 312, the lowest ranked search field is removed for content types yielding no results. This results in the keywords belonging to the lowest ranked search field being removed from the set of keywords for a particular content type. Keeping with the example from step 308, search field 102 will be removed from the set of search fields because its keyword 110 yielded no results, whereas keyword 114 in search field 106 will remain and be used in the next iteration of searching for content type 208. The effect of removing the lowest ranked search field is to broaden the search to ultimately find more results because the set of keywords has been broadened. The method 300 then repeats from step 304. The method 300 repeats until each content type has results or each search field has been removed.

At step 314, the results that are returned from the search are output to the user. In some embodiments, the results may be output in a user-readable format, such as the results GUI 200. In other embodiments, the results may be output in a computer readable format, such as JavaScript Object Notation (JSON) via an Application Programming Interface (API), for use by other computer programs, which may also present the results to the user. The results may include each document itself, a hyperlink to each document, a title of each document, an excerpt of each document, a synopsis of each document, graphical representations of each document, etc. The results may be output to the user as they are found in real time to show the user a live state of the search.

In some embodiments, the results may be cached in data storage hardware 408, external services 414, or user computers 416. Because keyword search filters 204 may be toggled to allow users to manually force a search with the corresponding keyword of the keyword search filter 204, a user may cause the search engine to run searches that have been performed in pervious iterations. Caching the results of each iteration could improve performance of the no fail searching method 300. Caches may also include the synopses and excerpts of the results as well.

Figure 4:
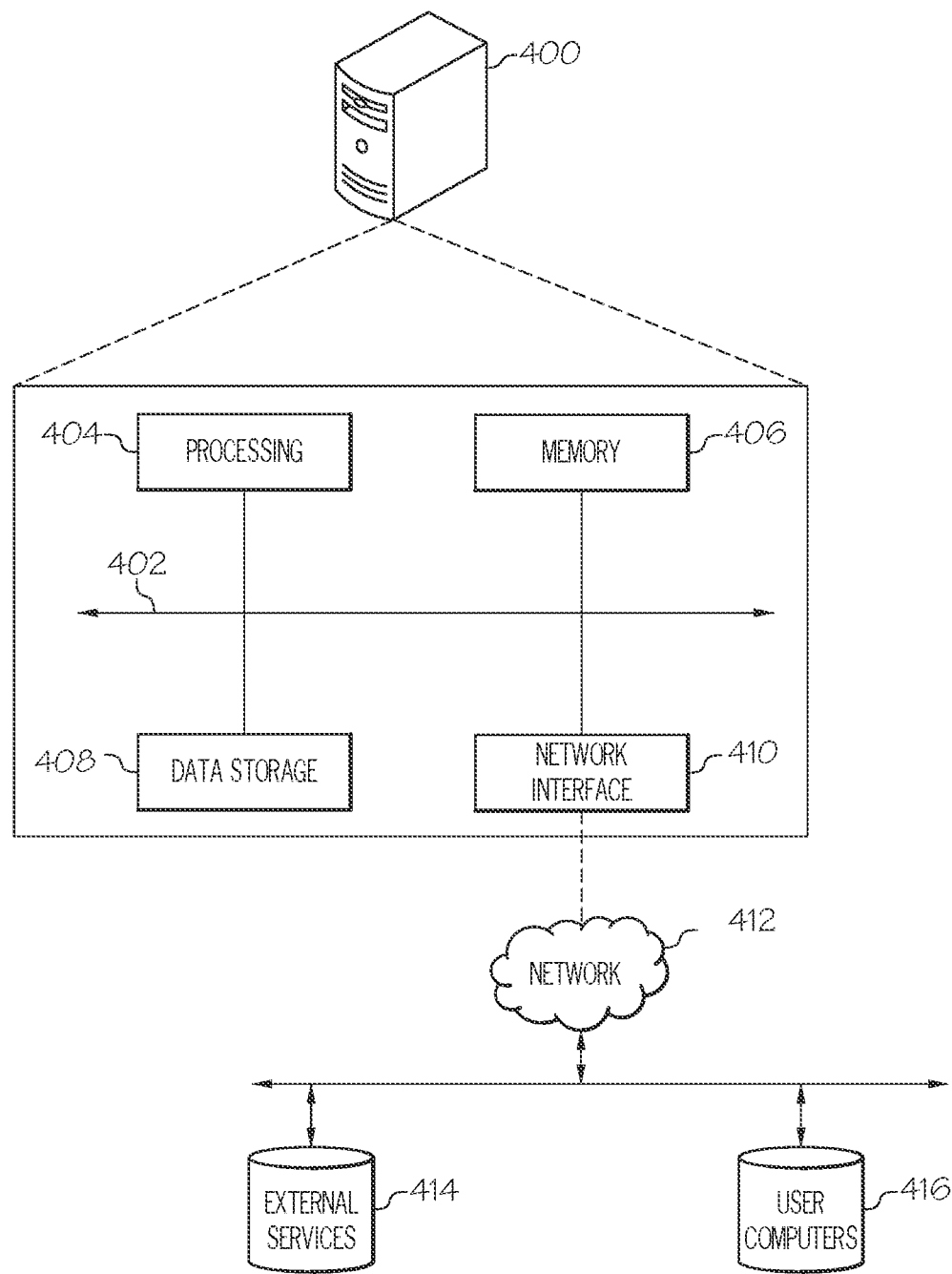
FIG. 4 is a schematic illustration of a server device illustrating hardware and software that may be used in carrying out the steps, according to one or more embodiments shown and described herein.

Referring now to FIG. 4, a schematic illustration of an example system is depicted. The system may comprise a server device 400 having hardware and software that may be used in carrying out the steps according to one or more embodiments shown. As illustrated, the server device 400 comprises a communication path 402, processing hardware 404, non-transitory memory hardware 406, data storage hardware 408, and network interface hardware 410. The communication path 402 communicatively connects the various hardware components of the server 400. The network interface hardware 410, allows the server 400 to connect to external services 414 and user computers 416 via network 412.

The processing hardware 404 may include one or more processors that may be any device capable of executing machine readable and executable instructions. Accordingly, each of the one or more processors of the processing hardware 404 may be a controller, an integrated circuit, a microchip, or any other computing device. The processing hardware 404 is coupled to the communication path 402 that provides signal connectivity between the various components of the server 400. Accordingly, the communication path 402 may communicatively couple any number of processors of the processing hardware 404 with one another and allow them to operate in a distributed computing environment. Specifically, each processor may operate as a node that may send and; or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 402 may be formed from any medium that is capable of transmitting a signal such as, e.g., conductive wires, conductive traces, optical waveguides, and the like. In some embodiments, the communication path 402 may facilitate the transmission of wireless signals, such as Wi-Fi, Bluetooth, Near-Field Communication (NFC), and the like. Moreover, the communication path 402 may be formed from a combination of mediums capable of transmitting signals. In one embodiment, the communication path 402 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory hardware 406 is communicatively coupled to the communication path 402 and may contain one or more memory modules comprising RAM, ROM, flash memories, hard drives, or any device capable of storing machine readable and executable instructions such that the machine readable and executable instructions can be accessed by the processing hardware 404. The machine readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory hardware 406. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The server device 400 may also include data storage hardware 408. The data storage hardware 408 is communicatively coupled to the communication path 402 and may contain one or more persistent storage devices such as solid state drives, hard disk drives, or any other device capable of persistent data storage. The data storage hardware 408 may store data used by various components of the server device 400 such as a database of electronic document files. In addition, the data storage hardware 408 may store data gathered from an external service 414 and/or received from user computers 416.

It should be understood that the data storage hardware 408 may reside local to and/or remote from the server device 400, and may be configured to store one or more pieces of data for access by the server device 400 and/or other components. The data storage hardware 408 may include electronic documents on which searches are performed. The data storage hardware 408 may also include indexes of the electronic documents and their corresponding metadata. Other data to perform the functionalities described herein may also be stored in the data storage hardware 408 (e.g., cached data, user session data, search session data, etc.).

The server device 400 also comprises network interface hardware 410. The network interface hardware 410 is communicatively coupled to the communication path 402. The network interface hardware 410 can be any device capable of transmitting and/or receiving data via a network or other communication mechanisms. Accordingly, the network interface hardware 410 can include a communication transceiver for sending and/or receiving any wired or wireless communication. For example, the network interface hardware 410 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The network interface hardware 410 communicatively connects the server device 400 to external systems, such as external services 414 and user computers 416, via a network 412. The network may be a wide area network, a local area network, a personal area network, a cellular network, a satellite network, and the like.

External services 414 include services that operate beyond the server device 400 that may be utilized by the server device 400, such as external data storage services, external processing services, external user authentication services, etc.

User computers 416 include computers that are used by individual users of the system such as laptop computers, desktop computers, smartphones, tablets, etc. that a user of the system may be requesting a search from and where the GUIs 100 and 200 may be presented to the user.

It should be understood that the components illustrated in FIG. 4 are merely illustrative and are not intended to limit the scope of this disclosure. More specifically, while the components in FIG. 4 are illustrated as residing within the server computing device 400, this is a non-limiting example. In some embodiments, one or more of the components may reside external to the server computing device 400. In some embodiments, the server computing device 400 may exist as a virtual machine operating within a host machine alongside other virtual machines, each of which share the same computing resources belonging to the host machine.

It should now be understood that embodiments described herein are directed to methods and systems for searching that return results from the most productive set of search terms, particularly methods and systems for searching a set of electronic documents that contain a set of keywords as input by the user. The search outputs a set of results grouped according to content type. If no results are found for any content type, however, the search is broadened by removing the lowest ranked search field. The process repeats until there are no more search fields to remove or each content type contains results.

The systems and methods described herein are not limited to the legal domain, and may be adapted to any type of content, either static or dynamic, without adding more complexity to the architecture. Embodiments provide for a method of searching that automatically broadens the keywords to obtain more search results. Thus, time and user interaction are needed to gather relevant search results over traditional searching methods.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is to be understood that recitations herein of "at least one" component, element, etc., should not be used to create an inference that the alternative use of the articles "a" or "an" should be limited to a single component, element, etc.

It is to be understood that recitations herein of a component of the present disclosure being "configured" or "programmed" in a particular way, to embody a particular property, or to function in a particular manner, are structural recitations, as opposed to recitations of intended use.

It is to be understood that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

What is claimed is:

1. A method for searching electronic documents, comprising:
   receiving a set of keywords from an input set of search fields within a graphical user interface (GUI);
   retrieving a set of search results based on the set of keywords from the input set of search fields;
   organizing the set of search results according to a set of content types;
   ranking each search field according to the set of content types;
   removing a lowest ranked search field from the set of keywords to create a broadened set of search fields when at least one content type has zero results; and
   automatically repeating the retrieving, organizing, ranking, and removing steps until either each content type contains a threshold amount of search results or all search fields have been removed, wherein the broadened set of search fields is used as the input set of search fields in subsequent retrieving steps.

2. The method of claim 1, wherein the set of keywords is received via either a software application embedded within or provided as a plug-in for a web browser GUI.

3. The method of claim 1, further comprising acquiring and displaying a hyperlink of each search result leading to an electronic document of the search result.

4. The method of claim 1, further comprising acquiring and displaying a synopsis of each search result.

5. The method of claim 1, further comprising displaying a live state of the set of search results as the repeating step continues.

6. The method of claim 1, further comprising communicating the set of search results to a server for indexing and future retrieval upon subsequent searches utilizing the same keywords.

7. The method of claim 6, further comprising checking, before retrieving a set of search results, whether a particular search has been previously performed, and retrieving the previously communicated set of search results.

8. The method of claim 1, further comprising presenting the set of search results within a GUI.

9. The method of claim 8, further comprising presenting the set of search results divided into content types within a GUI.

10. The method of claim 1, wherein, upon completion of the search, search fields may be added and removed to manually fine-tune the search.

11. A system for searching electronic documents, comprising:
    one or more processors; and
    a non-transitory computer-readable medium storing computer-readable instructions that, when executed by the one or more processors, cause the one or more processors to:
       receive a set of keywords from an input set of search fields within a graphical user interface (GUI);
       retrieve a set of search results based on the set of keywords from the input set of search fields;
       organize the set of search results according to a set of content types;
       rank each search field according to the set of content types;
       remove a lowest ranked search field from the set of keywords to create a broadened set of search fields when at least one content type has zero results; and automatically repeat the retrieve, organize, rank, and remove steps until either each content type contains a threshold amount of search results or all search fields have been removed, wherein the broadened set of search fields is used as the input set of search fields in subsequent retrieving steps.

12. The system of claim 11, wherein the set of keywords is received via either a software application embedded within or provided as a plug-in for a web browser GUI.

13. The system of claim 11, further comprising acquiring and displaying a hyperlink of each search result leading to an electronic document of the set of search results.

14. The system of claim 11, further comprising acquiring and displaying a synopsis of each search result.

15. The system of claim 11, further comprising displaying a live state of the set of search results as the repeating step continues.

16. The system of claim 11, further comprising communicating the set of search results to a server for indexing and future retrieval upon subsequent searches utilizing the same keywords.

17. The system of claim 16, further comprising checking, before retrieving a set of search results, whether a particular search has been previously performed, and retrieving the previously communicated search results.

18. The system of claim 11, further comprising presenting the set of search results within a GUI.

19. The system of claim 18, further comprising presenting the set of search results divided into content types within a GUI.

20. The system of claim 11, wherein, upon completion of the search, search fields may be added and removed to manually fine-tune the search.

* * * * *